United States Patent [19]

Miyahara et al.

[11] Patent Number: 4,834,638

[45] Date of Patent: May 30, 1989

[54] APPARATUS FOR MOLDING A HEAD END AN A TUBULAR CONTAINER

[75] Inventors: Masaaki Miyahara; Atsuo Matsui; Koh Shimizu; Hirokazu Ihara; Teruo Miyazawa, all of Sakaki, Japan

[73] Assignee: Nissei Jushi Kogyo Kabushiki Kaisha, Nagano, Japan

[21] Appl. No.: 36,560

[22] Filed: Apr. 9, 1987

[30] Foreign Application Priority Data

Apr. 9, 1986 [JP] Japan ................................ 61-81581

[51] Int. Cl.⁴ ...................... B29C 33/14; B29C 33/16; B29C 39/10; B29C 45/33

[52] U.S. Cl. .................................... 425/116; 249/88; 249/91; 249/93; 425/126.1; 425/127; 425/129.1; 425/135; 425/393; 425/395; 425/398

[58] Field of Search ..................... 264/40.1, DIG. 41; 425/112, 116, 117, 126 R, 129 R, 150, 576, 135, 121, 125, 127, 128, 393, 395, 398, 126.1, 128, 129.1; 249/83, 85, 91, 93, 94, 96, 97

[56] References Cited

U.S. PATENT DOCUMENTS

| | | | |
|---|---|---|---|
| 2,777,164 | 1/1957 | Strahm | 264/DIG. 41 |
| 2,883,706 | 4/1959 | Quinche et al. | 264/DIG. 41 |
| 2,994,107 | 8/1961 | Quinche | 425/576 |
| 3,260,777 | 7/1966 | Brandt | 425/380 |
| 3,313,875 | 4/1967 | Magerle | 425/129 R |
| 3,356,263 | 12/1967 | Monroe | 222/107 |
| 3,475,786 | 11/1969 | Pearson | 425/150 |
| 3,629,385 | 12/1971 | Badavas et al. | 264/DIG. 41 |
| 4,496,513 | 1/1985 | Ishikawa et al. | 425/112 |
| 4,518,554 | 5/1985 | Hazakeyama et al. | 425/129 R |
| 4,525,318 | 6/1985 | Reil et al. | 264/DIG. 41 |

Primary Examiner—Willard Hoag
Attorney, Agent, or Firm—Birch, Stewart, Kolasch & Birch

[57] ABSTRACT

A tube container molding apparatus in which a cylindrical tube is inserted into a split mold in its closed state so that the end section of the tube comes into contact with a cavity face of the split mold. A core is then advanced to fit into the tube from its rear end, and finally a resin melt is introduced into the cavity formed by the cavity face of the split mold and the end face of the core.

When the resin melt is injected into the cavity, a tube holding piece pushes the tube against the core to prevent the tube from being drawn out of the cavity.

Midway during the advance of the core into the tube, the tube is held by the tube holding piece and the further advance of the tube is made together with the core. Thus, the forward end section of the tube is bent inward to a prescribed width.

18 Claims, 18 Drawing Sheets

APPARATUS FOR MOLDING A HEAD END AN A TUBULAR CONTAINER

BACKGROUND AND SUMMARY OF THE INVENTION

The present invention relates to a process for producing tube containers by molding a container mouth section of resin (e.g., plastic) and fixing it onto one end of a tube, and to a molding apparatus for manufacturing the same.

FIG. 17 shows a sectional view of a conventional tube container 80.

The tube container 80 is formed by molding a container mouth section 82 of resin and fixing it to one end of a tube 81 made of laminated metallic foil and plastic sheets.

In using the tube container 80, a suitable cap is applied on the container mouth section, and a pasty content such as dentifrice, mustard, or wasabi (i.e., Japanese horseradish) is introduced into the container. Finally, the bottom section is sealed.

The tube container 80 is formed by molding and fixing the container mouth section to a previously formed tube 81.

Conventionally, the formation of the container mouth section 82 on the tube has been effected exclusively by compression molding.

FIGS. 18–20 illustrate the sequence of the conventional compression molding system.

First, as shown in FIG. 18, a tube 81 is inserted onto the core 84 of a core mold 83 and fixed there.

Next, a split mold 85 is closed causing the forward end edge of the tube 81 to be bent slightly inward. A resin melt is introduced into the cavity within the split mold 85, and a movable mold 86 is applied to compress the resin melt into the container mouth section (FIG. 19). Finally, the mold assembly is disassembled to take out the tube container thus formed (FIG. 20). The reason why the forward edge of the tube 81 is bent slightly inward is to increase the bonding strength between the tube 81 and the container mouth section 82.

The above-described conventional tube-container manufacturing apparatus involves a number of problems as follows:

(1) Simultaneous multiple manufacture is difficult, thus productivity cannot be increased.

(2) The split mold 85, when closed to form the bent section, may pinch the tube 81. In such a case, the tube 81 is deformed and the incomplete closure of the split mold 85 causes the resin melt to leak out whereby inferior products are produced.

(3) In the compression mold as already described, resin melt is introduced into the open cavity of the core mold where it is compressed merely by the movable mold 86. Thus, the molding pressure in itself cannot be effectively raised. Such a low pressure is apt to result in unequal pressure exerted on the resin melt inside the cavity and in the sink mark in the shoulder of the container mouth section 82, etc., which inevitably leads to low dimensional precision. Therefore, container mouth sections of complex shape are very hard to manufacture through molding.

(4) It is difficult to introduce a predetermined amount of resin melt into the cavity, which results in dimensional errors in the molded products.

(5) For the main reasons that no prescribed amount of resin melt can be introduced and that the mold assembling pressure is low, molded products tend to have flashes which necessitate an extra deflashing process.

SUMMARY OF THE INVENTION

The present invention has been made to solve the above-listed conventional problems.

Accordingly, an object of the present invention is to provide a tube container molding process of low production failure in which the tubes to be processed are not pinched by the split mold, and thus are free from becoming damaged. Also, no resin will leak out.

Another object of the present invention is to provide a tube container molding apparatus which is capable of multiple production and capable of producing high-quality tube containers.

The above-listed problems have been solved according to the present invention, by closing the split mold, inserting the forward end section of the tube into a tube insertion hole of the split mold, introducing the core of a core mold into the tube from the rear end of the tube, and filling the cavity with the resin melt.

Filling the cavity with resin melt may be performed essentially by either compression molding or injection molding. However, the latter method is preferable for producing tube containers of high quality with high quantity.

Injection molding necessarily requires higher pressure inside the cavity than compression molding. Accordingly, a tube holding means is needed to prevent the injection pressure from drawing the tube out. In effective tube holding means, for example, a cylinder device is used so that the tube is under pressure between the device and the outer core surface.

The tube for the tube container is bent inward at its forward end section to enhance the adhesive strength between the tube and the molded container mouth section. To effect this inward bending of the forward end section of tube, the tube holding means holds the tube over the core outer surface in a prescribed stage while the core of the core mold is advanced into the tube. Subsequently, the tube is allowed to advance a prescribed distance into the split mold together with the core, with the forward end of tube being bent inward along the cavity face of the split mold. For the tube to be advanced together with the core into the split mold, tube holding means is necessarily provided on the core mold side. Of the various positions on the core mold, a favorable position for providing the tube holding means is the one which is relatively close to the split mold. With such a configuration, the position at which the tube is held by the tube holding means is made to be near the container-mouth section. Therefore, while the tube is being pushed into the split mold, the tube is not deformed and any tubes of the same diameter may be utilized independently of length. Thus even short tubes can be used, which enables the same molding apparatus to produce a variety of tube containers of different volumes.

It is possible to make constant the width to which the forward end section of the tube is bent inward if a position detecting means is provided which serves to detect the advance position of the core, since the tube holding means holds the tube midway while the core advances into the tube.

The mold may be either of the 2-plate system including the core and split molds or of the 3-plate system including the movable, middle and fixed molds.

In the case of the 3-plate system, the core is provided on the movable mold, the split mold is provided on the middle mold, and the fixed mold is provided with the resin path from the injection machine. For these provisions, it is preferable that the forward end section of the core mold should be provided with a gate hole which has one end open to communicate with the resin path of the fixed mold. The other end opens as a pin-point gate to the cavity for molding the container mouth section. With this structure, the injection port for introducing the resin into the container mouth section may be set on the inner wall of the container mouth section, resulting in a highly improved appearance of the tube container. In addition, the sprue branch formed at the gate hole may be automatically cut off the inner wall of container mouth section during the mold disassembly in which the core is withdrawn from the tube.

Also in the case of the 3-plate system, such a structure is adaptable as it employs only one set of movable and fixed molds and a plurality of middle molds provided on a rotary table. Continuous molding is possible since rotation of the rotary table allows each middle mold to be located, in turn, between the movable and fixed molds. With this structure, production efficiency may be increased since either the tube insertion into the middle mold or the withdrawal of molded products may be carried out while other middle molds are engaged in the molding processes. In addition, favorable working conditions may be arranged since the tube insertion and the withdrawal of molded products may be executed at positions away from the molding position.

It is also effective for promoting efficiency to design the support table for the middle mold to be slidable, thus allowing the middle mold to slide alternately between the movable and fixed molds for the purpose of molding.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 18 shows a vertical, sectional view of the mold in the open state, FIG. 19 shows a vertical, sectional view in the molding state, and FIG. 20 shows a vertical, sectional view of the molded-product in its withdrawn state.

DESCRIPTION OF THE PREFERRED EMBODIMENTS

The preferred embodiments of the present invention will be described below in detail by reference to the accompanying drawings.

Figure 1:
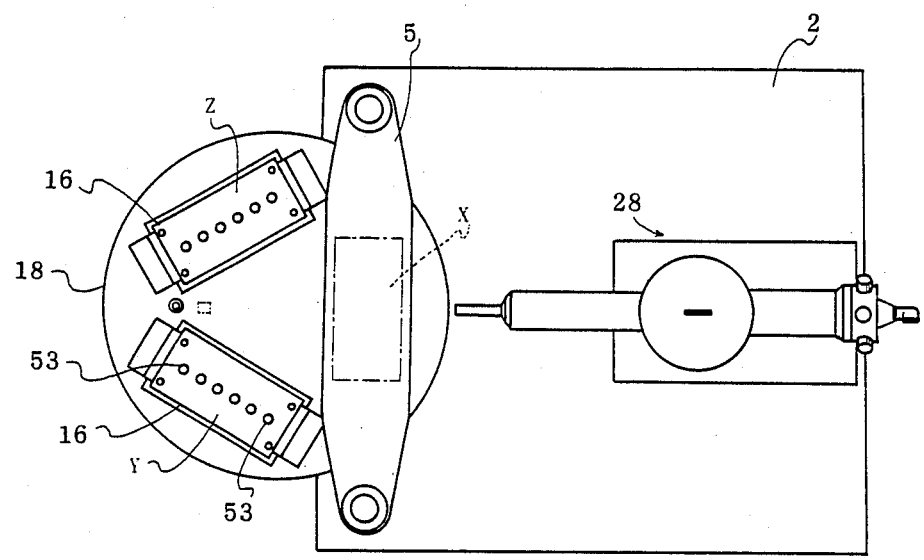
FIG. 1 shows a plan view of a molding apparatus with 3 middle molds on a rotary table.
Figure 2:
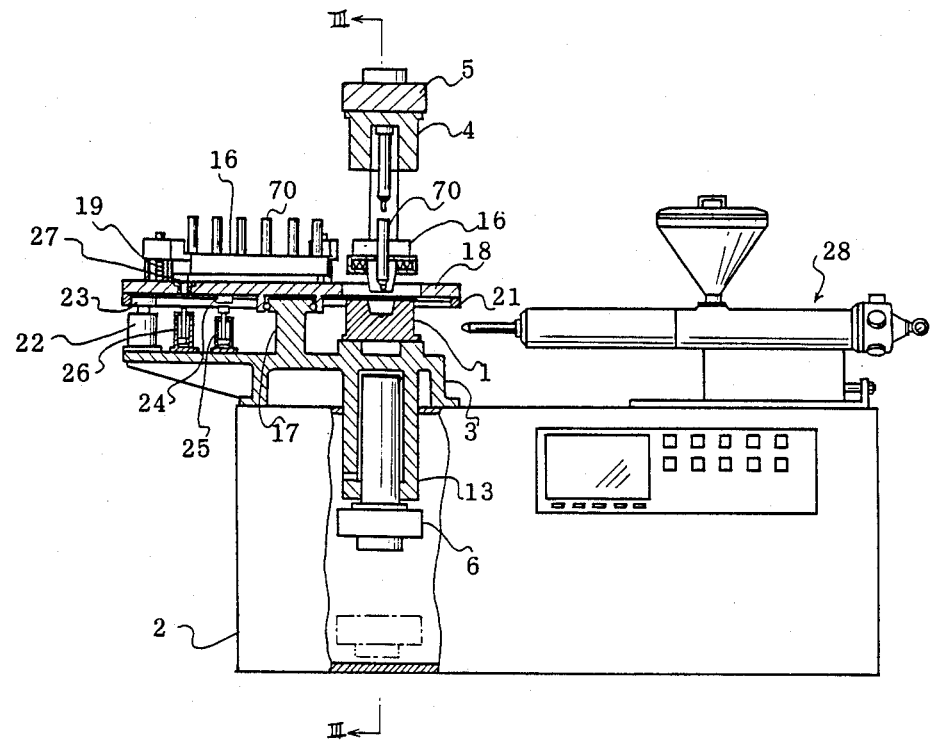
FIG. 2 shows a front view of the molding apparatus of FIG. 1 with exposed essential sections.
Figure 3:
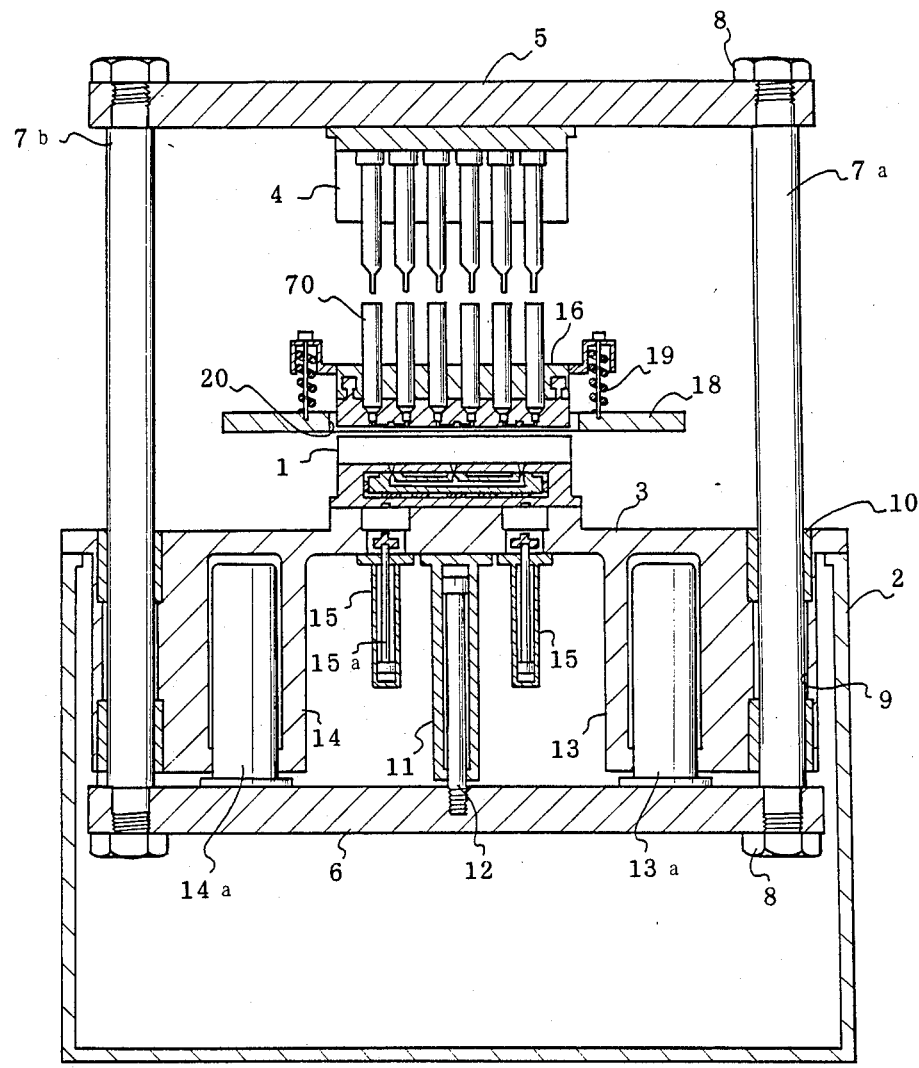
FIG. 3 shows a vertical sectional view taken along the line III—III of FIG. 2.

First, the overall apparatus will be outlined by reference to FIGS. 1–3. As is obvious from FIGS. 2 and 3, a fixed mold 1 is fixed on the upper face of a board or support 3, fixed on a base 2. A movable mold 4 is fixed to the lower face of a movable board or support 5 above the fixed mold 1 and facing the fixed mold 1. A movable board 6 is located beneath the fixed board or support 3 and is connected to the movable board 5 by two tie bars 7a and 7b via a connecting nut 8. The tie bars 7a and 7b are slidably guided in the vertical direction via a tie bar bushing 10 through a through-hole 9 provided in the fixed board 3.

A mold-closing cylinder 11 is fixed on the lower face of the fixed board 3, and the piston rod 12 thereof is connected to the movable board or member 6. When the mold opening-closing cylinder 11 is driven, the movable boards 5 and 6 and the tie bars 7a and 7b are caused to go up and down and the movable mold 4 is caused to move toward and away from the fixed mold 1. The fixed board 3 is provided with mold-tightening cylinders 13 and 14, and mold-tightening rams 13a and 14a are provided in the mold-tightening cylinders 13 and 14 so as to project against the upper face of the movable board 6.

The fixed board section below the fixed mold 1 holds lift cylinders 15 and 15 whose piston rod 15a is designed to go up and down in the through-hole on the fixed board 3. The lift cylinder 15 is used to detach the fixed mold 1 for mold replacement.

A middle mold 16 is located between the fixed mold 1 and the movable mold 4. The middle mold 16 is held on a rotary plate 18 which is a table rotatable about a shaft 17 provided on the fixed board 3 by spring arrangement 19 which provides an upward bias. The middle mold 16 moves toward and away from the fixed mold 1 via an opening 20 located in the rotary plate 18.

Three sets of middle molds 16 of the same structure are set on the rotary plate 18 at 120° intervals.

The rotary plate 18 is rotated when an output gear 23 comes into engagement with an internal gear 21 provided under the rotary plate 1B. The three sets of middle molds 16 are in turn brought between the fixed mold 1 and the movable mold 4 as the rotary plate 18 is rotated.

A stopper 24 is provided on the lower face of the rotary plate 18, and a stopper cylinder 25 is provided on the upper face of the fixed board 3. When the middle mold 16 provided on the rotary plate 18 has been rotationally located between the fixed mold 1 and the movable mold 4, the stopper 24 hits the rod of the stopper cylinder 25, preventing the rotation of the rotary plate 18. When the rotary plate 18 has been stopped in the above-mentioned way, the rod of a positioning cylinder 26 goes into the guide hole 27 on the rotary plate 18, stopping the rotary plate 18 with precise positioning. The rotary plate 18 resume rotation when both the stopper cylinder 25 and the positioning cylinder 26 draw their rods inward One stopper cylinder 25 and one positioning cylinder 26 are provided, and three stoppers 24 and three guide holes 27 are provided each in correspondence with each middle mold.

The injection machine 28 is of the well-known inline screw system type and provides for movement to and from the below-described hot runner block nozzle of the fixed mold 1.

Note that, in FIG. 1, the position X where the middle mold 16 is located between the fixed mold 1 and the movable mold 4 is the molding stage, position Y located forward to position X is the tube insert stage, and that position Z which is behind position X is the withdrawal stage.

Figure 4:
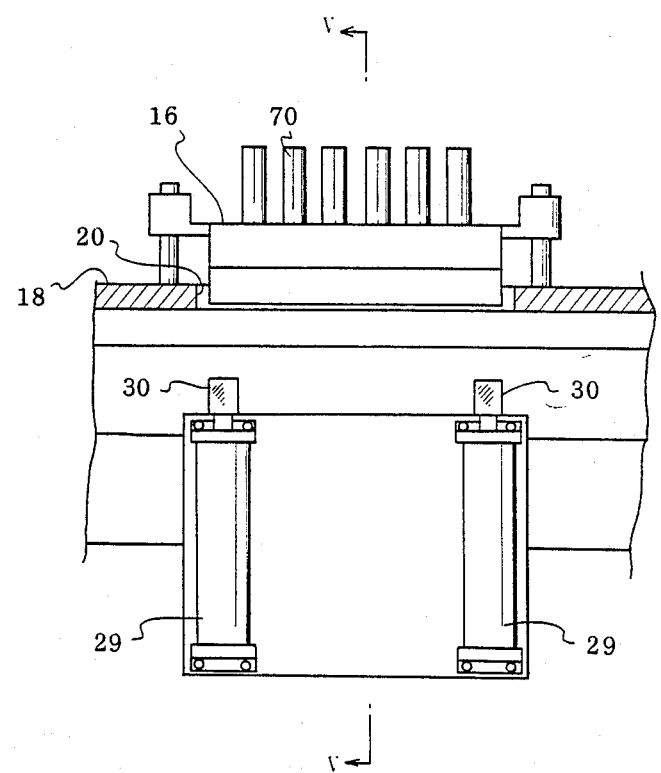
FIG. 4 shows a partial front view of a middle-mold disassembling mechanism.
Figure 5:
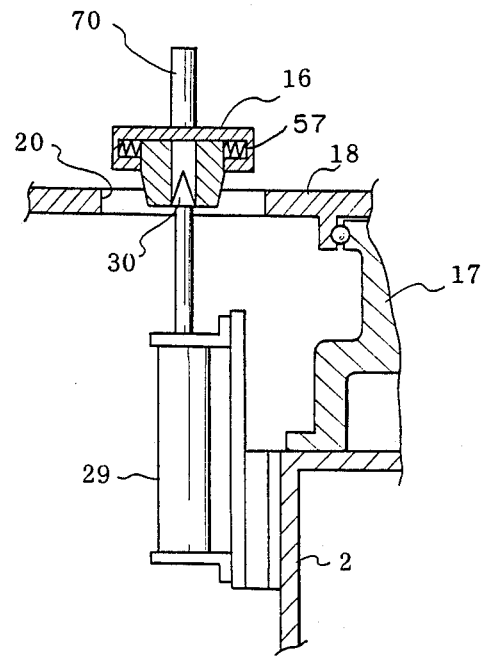
FIG. 5 shows a vertical, sectional view taken along line V—V of FIG. 4.

Below the withdrawal stage Z at its corresponding position on the base 2, there is fixed a mold-splitting cylinder 29 which serves to split a split mold (described below) as the middle mold 16 (FIGS. 4 and 5). A wedge 30 provided at the end of the rod of the mold-splitting cylinder 29, extends into the split mold for mold splitting purposes, thus separating mold parts 56 which are later described.

Next the structure of the molds will be explained by reference to FIGS. 6-9.

The movable mold 4 comprises an attachment board or support section 31 attached to the movable board or support 5, a control board or support section 33 which is attached in a unit of the attachment board section 31 and whose edge has a vertical wall 32 extending toward the fixed mold 1, and six cores 34 having upper ends which are fixed on the attachment board section 31 and which project downward through the control board section 33.

The lower face of the vertical wall 32 of the control board section 33 comes into contact with the upper-face circumferential edge of the middle mold 16 when the movable mold 4 descends toward the fixed mold 1 and depresses the middle mold 16 against the elastic pressure of the lift spring 19 as the movable mold 4 descends.

The six cores 34 are positioned on a straight line at the same intervals, with the forward end section thereof projecting downward below the lower face of the vertical wall 32.

Figure 8:
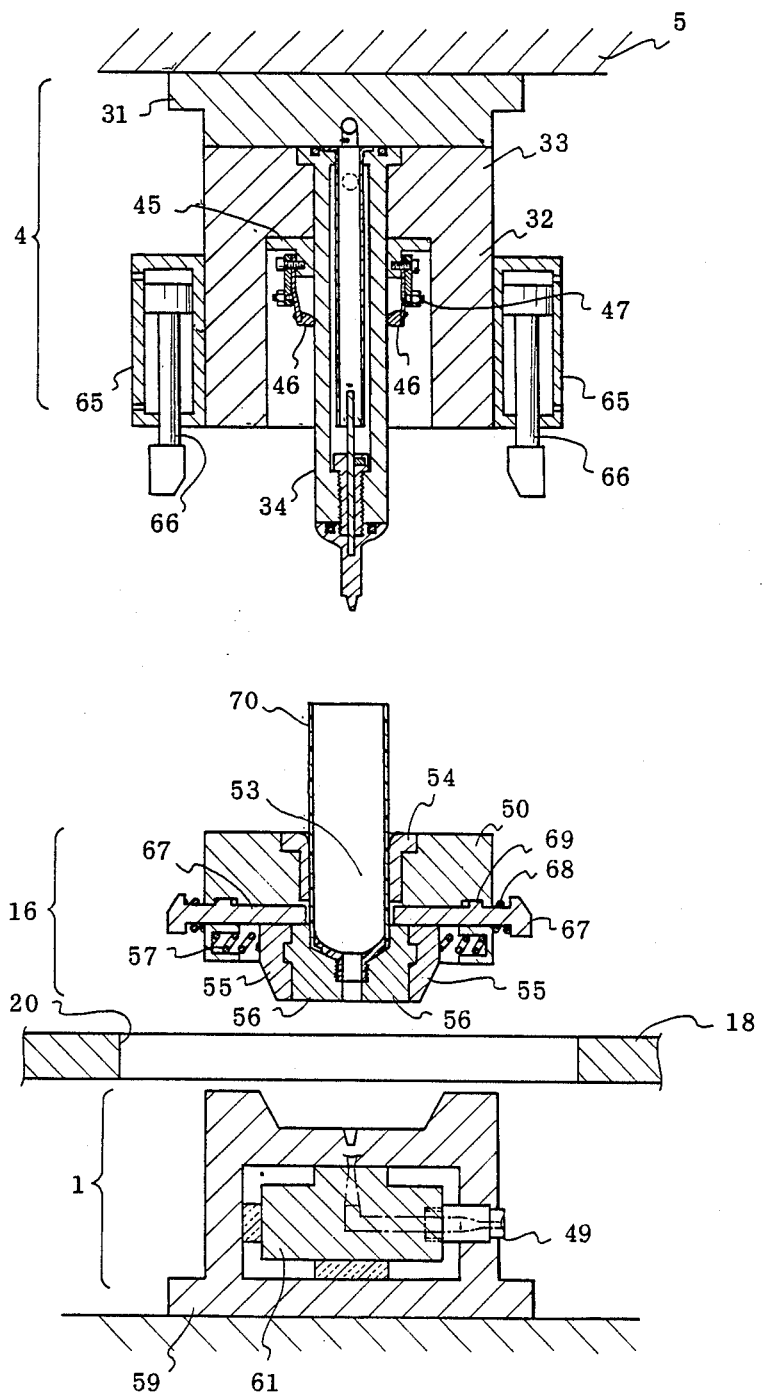
FIG. 8 shows a vertical, sectional view taken along line VIII—VIII of FIG. 6.
Figure 9:
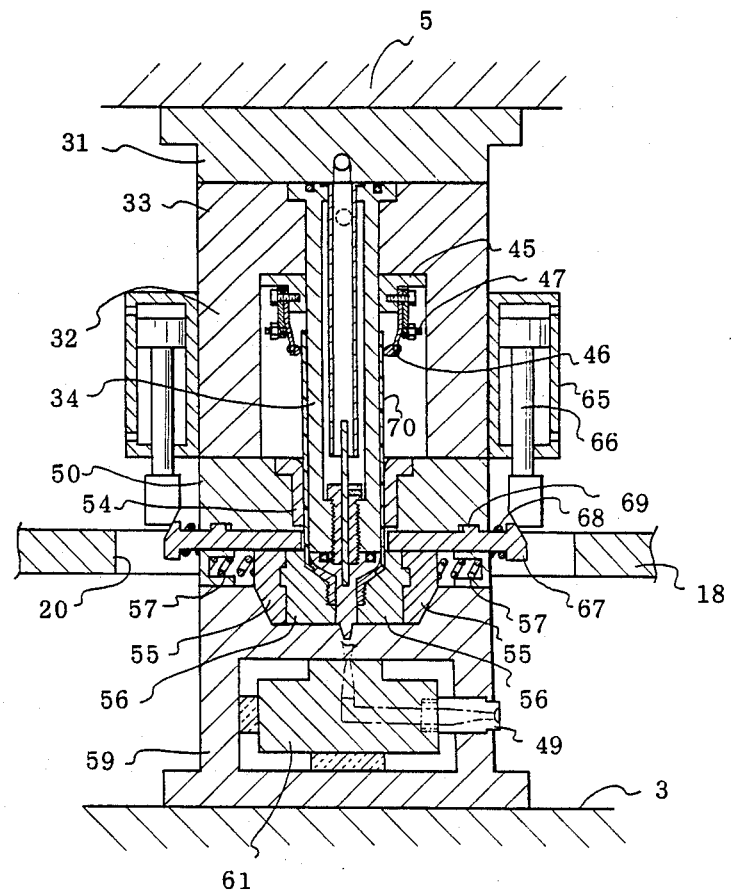
FIG. 9 shows a vertical, sectional view taken along the line IX—IX of FIG. 7.

A core body 35 is formed in a cylinder and the lower section of the core body 35 has fixed thereto a core forward end piece 36 which forms the shape of the inner face of the mouth section of tube container. The connection between the core body 35 and the core forward end piece 36 is effected by a heat pipe holder 37 having the male screw section thereof positioned between them. The heat pipe holder 37 has a heat pipe 38 inserted therein whose lower end extends into the inside of the core forward end piece 36 and whose upper end extends into the hollow of the core proper 35. The heat pipe 38 is fixed on the heat pipe holder 37 by a setscrew applied from the side of the heat pipe holder 37 (FIGS. 8 and 9). A cooling pipe 39 penetrates the hollow of the core proper 35. The upper section of the heat pipe 38 is also included in the lower section of the cooling pipe 39. Cooling water descends within the cooling pipe 39 from a cooling water supply opening 40, ascends the gap between the outer wall of the cooling pipe 39 and the inner wall of the core body 35, and is discharged from the cooling water discharge opening 41. Seal rings 42 and 43 are utilized.

The forward end of the core forward end piece 36 is formed into a smaller diameter. A gate hole 44 starts from the stepped section of the smaller diameter of the core forward end piece 36, penetrates upward slantly the core forward end piece 36, and reaches the wall on the opposite side in an opening of reduced diameter.

A tube catch holder 45 is fixed on the control board section 33 As shown in FIGS. 8 and 9, the tube catch holder 45 is provided with tube catches 46, one pair for each core 34, whose forward end sections are in pressure contact with the upper outer face of each core 34 from both sides of core 34. The tube catch 46 is made of plate spring, and the elastic pressure exerted on the outer face is adjusted by an adjusting screw 47.

A middle mold 50 is guided by a lift bolt 52 applied through a middle mold holding piece 51 so as to be freely movable in the vertical direction. The middle mold 50 is pushed upward by the lift spring 19 provided between the upper face of the rotary plate 1s and the middle mold holding piece 51, and is retained under pressure at this position where the upper face thereof is in contact with the head section of the lift bolt 52.

At positions on the middle mold 50, facing each of the six cores 34 of the movable mold 4, there are provided insert holes 53 in the vertical direction, into which holes are inserted tubes for the tube container to be produced. In the example shown, the insert hole is formed by applying a guide bushing 54, in the form of a flanged cylinder, in the through-hole provided on the middle mold proper 50. The guide bushing 54 is not always needed. The through-hole provided on the middle mold 50 may be used as the insert hole. The upper section of the insert hole 53 is advantageously slightly enlarged in diameter to facilitate the insertion of the tube.

Figure 6:
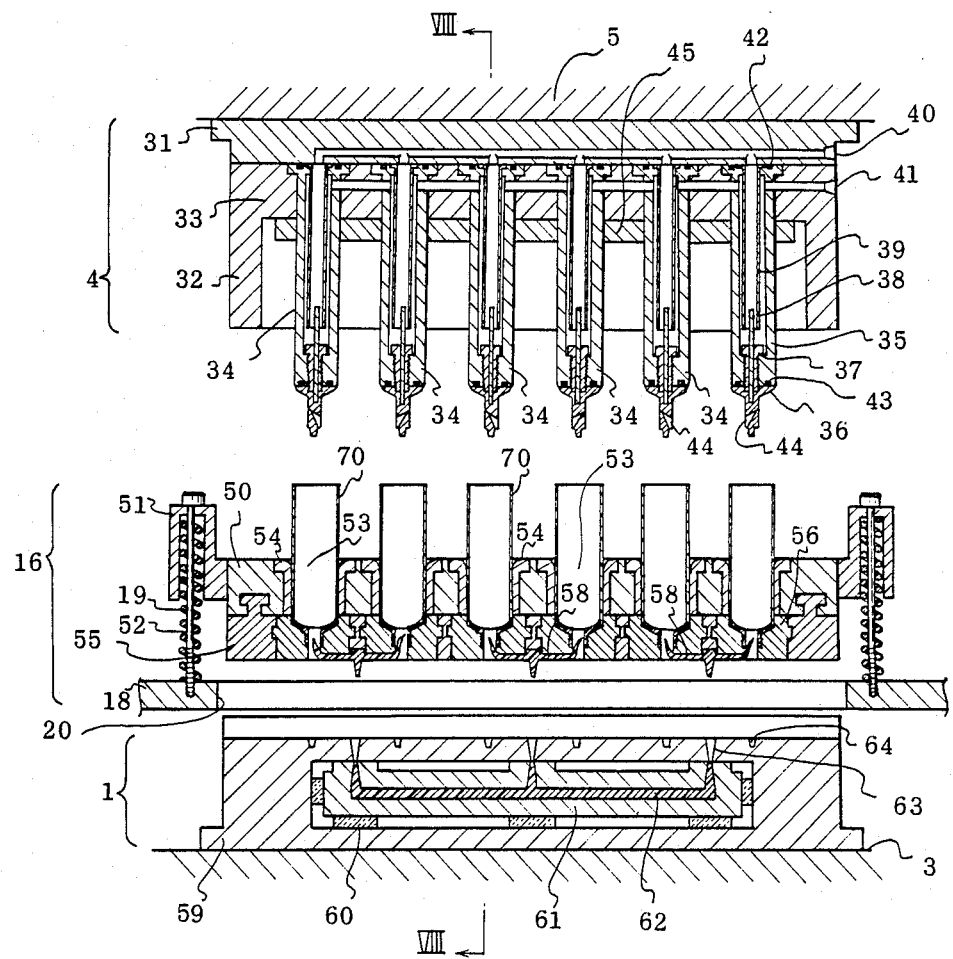
FIG. 6 shows a vertical sectional view of the movable, middle, and fixed molds in the opened-state, after molding.
Figure 7:
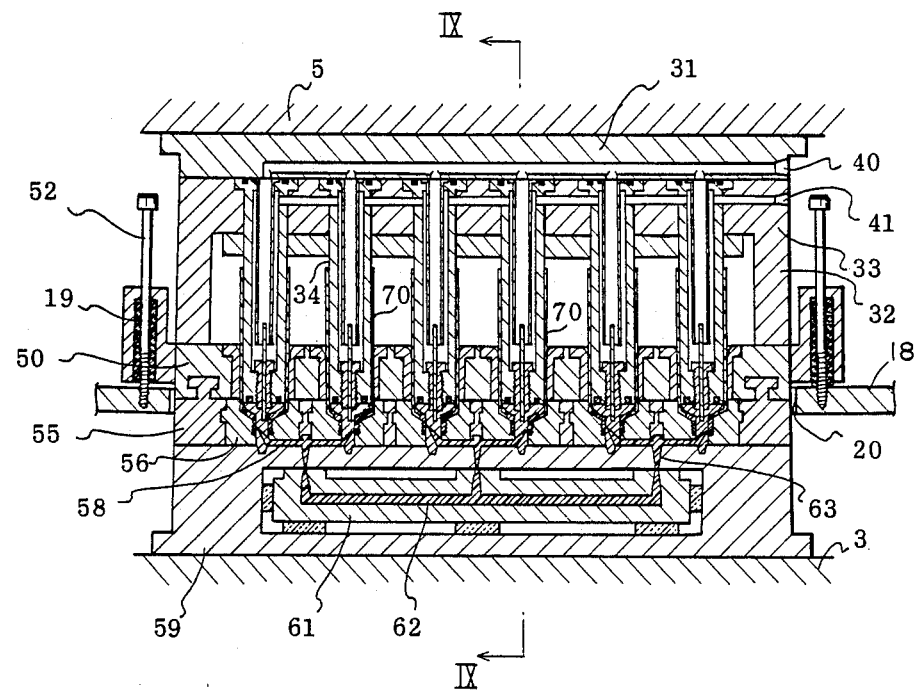
FIG. 7 shows a vertical sectional view of the movable, middle, and fixed molds in a closed-state with a resin melt being injected.

As is obvious from FIGS. 8 and 9, a pair of telescopic or reciprocating holders 55 is provided on the lower face of the middle mold 50 across the line of the insert holes 53. As shown in FIGS. 6 and 7, the telescopic holder 55 is in sliding contact with the middle mold 50 by a dovetailed groove or T groove so as to be capable of moving in the direction with the insert holes 53 disposed therebetween. A nest 56 has the structure of a split mold having two parts. The nest parts are held in the telescopic holders 55 below each insert hole 53. Each pair of nest parts 56 forms a cavity face in agreement with the outer shape of the tube mouth section when the telescopic holders 55 are energized in the approach direction for closing the mold. The pair of telescopic holders 55 is usually held under pressure by a mold splitting spring 57 in the approach direction, while each pair of nest parts 56 is provided for closing the mold. As will be described later, the space, to be formed by the cavity face of the nest 56 and the forward end face of the core forward end piece 36, will become the cavity for injection molding to form the tube container mouth section when a tube is inserted into the insert hole 53, the movable mold 4 is lowered, the core 34 is advanced into the tube, the lower face of the vertical wall 32 of the movable mold 4 comes into contact with the upper face of the middle mold 50, and finally the movable mold 4 approaches close to the middle mold 16.

On the lower face of the nest 56 there is provided a resin path 58 which is led to the above-mentioned cavity through the gate hole 44 provided on the core, forward end piece 36.

The nest 56 is provided with a suitable cooling-water path, not shown.

The nest 56 is detachably accommodated in the telescopic holders 55 so that replacement of the nest 56 allows molding of a variety of container mouth sections of different shapes.

The fixed mold 1 includes a fixed mold 59 attached to the upper face of the fixed board 3 and a hot runner block 61 internally provided in the fixed mold 59 via a thermal insulator 60.

On the hot runner block 61 there are formed a spool bushing 49 opened to the side wall of the fixed mold 59 and a resin path 62 leading to the spool bushing 49.

On the fixed mold 59 there is formed a resin path (passage means) 63, which connects the resin path (passage means) 58 provided on the lower face of the nest 56 with the resin path 62 inside the hot runner block 61, and with a dented section 64 which the core forward end section of the movable mold 4 may enter. Next, the tube holding mechanism will be explained by reference to FIGS. 8 and 9.

Tube holding cylinders 65 are provided at each of the four corners of the control board section 33 of the movable mold 4. The forward end of the piston rod 66 of the tube holding cylinder 65 has a tapered configuration.

A pair of tube holding pieces 67 is in sliding contact with the through-holes bored from both the side walls of the middle mold 50 to each insert hole 53 in such a way that the forward end of the tube holding piece 67 is capable of moving against and away from the inner wall of the insert hole 53. Each pair of tube holding pieces 67 is provided in each insert hole 53. The section of each tube holding piece 67, which projects from the side wall of the middle mold 50, is constructed to be enlarged, and a spring 68 which is provided between this enlarged section and the side wall of the middle mold 50 pushes the tube holding piece 67 so that the forward end thereof may usually be prevented from projecting through the inner wall of the insert hole 53. Element 69 is a disengagement preventing stopper. The six tube holding pieces projecting through the side walls of the middle mold 50 are connected with one another by a connecting bar (not shown) and thus slide together. The enlarged section of the tube holding piece 67 located immediately below the tube holding cylinder 65 has a tapered surface formed thereon which faces the tapered surface of the piston rod 66 of the tube holding cylinder 65. When the piston rod 66 is lowered, the tapered surface thereof presses the tapered surface of the tube holding piece 67 against the elastic force of the spring 68, and then the forward end of each tube holding piece 67 is projected toward the inner wall of the insert hole 53, thereby pinching the tube which has been previously inserted into the insert hole 53, against the core 34.

In the above description, the tube holding cylinder 65 is provided on the movable mold 4. The cylinder 65 may be provided on the middle mold 50. In addition, though not shown, the tube may be held by iron needles energizable by electromagnetic solenoids. Further, tube holding cylinders 65 for driving the tube holding pieces 67 may be provided on each of the tube holding pieces 67. In this case, the energizing force of each tube holding cylinder 65 is advantageously made to be adjustable so that each tube holding force may be adjusted independently.

Next, the tube container molding sequence will be explained, together with the process according to the present invention.

Figure 10:
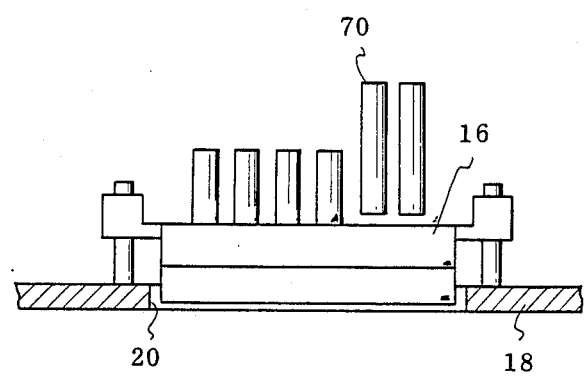
FIG. 10 shows a front view illustrating the stage where a tube is being inserted on the insert stage into the middle mold.

Into the insert hole 54 of the middle mold 16 in the insert stage Y, a tube (laminate tube) made of laminated metallic foils and plastic resin sheets is inserted (FIGS. 2 and 10).

The index motor 22 is driven to rotate the rotary plate 18 until the middle mold 16, once positioned on the insert stage Y, stops on the molding stage X with such positioning as already described. The next mold 16 is now positioned on the insert stage Y and another tube 70 is similarly inserted.

Pressure oil is supplied to the oil chamber in the upper section of the mold opening-closing cylinder 11, and then the movable boards 5 and 6 and the movable mold 4 go down together with the tie bar 7. Into the mold-tightening cylinder 13 oil is drawn via a prefill valve (not shown).

The movable mold 4 moves down making the core 34 thereof advance into the tube 70. Simultaneously, the tube catch 46 pushes the tube 70 down, making the lower end of the tube 70 advance along the cavity face of the nest (split mold) 56 to be bent slightly inward. On further lowering of the movable mold 4, the tube 70 will not advance any further and the tube catch 46 will move down over the tube 70. When the lower face of the vertical wall 32 of the movable mold 4 has come into contact with the upper face of the middle mold 50, the lift spring 19 is compressed causing the middle mold 16, together with the movable mold 14, to move down until they hit the fixed mold 1 (FIG. 9).

When the tube holding cylinder 65 is set to drive, the piston rod 66 thereof is lowered with its tapered surface pushing the tube holding piece 67. Thus, the tube 70 is held under pressure between the pair of tube holding pieces 67 and the core 34. Pressure oil is sent into the mold-tightening cylinder 13 for high-pressure mold tightening.

The injection machine 28 advances until it comes into contact with the fixed mold 1, at which time the resin melt is injected. The resin melt passes successively along the resin path 62, on the hot runner block 61, the resin path 63 on the fixed mold, the resin path 58 on the middle mold 16, and the gate hole 44 to fill the cavity. Then the resin is cooled.

As to the above cooling stage, cooling water supplied through the cooling water supply opening 40 descends through the cooling pipe 39, ascends through the inside of the core proper 35, and is removed through the water discharge opening 41. The core forward end piece 36 is also cooled via the heat pipe 38. The nest 56 also is cooled by cooling water flowing through a cooling pipe not shown.

Upon completion of cooling, the piston rod 66 of the tube holding cylinder 65 is raised, and the spring 68 allows the tube holding piece 67 to return to its original position, thereby releasing the holding of the tube 70.

The supply of pressure oil to the mold-tightening cylinder 13 is stopped, and pressure oil is sent to the lower oil chamber of the mold opening-closing cylinder 11 to initiate the opening of the mold. The opening starts between the middle mold 16 and the fixed mold 1, with the runner branch, held by the undercut section of the runner, going up together with the middle mold 16 (nest 56).

When the middle mold holding piece 50 of the middle mold 16 comes into contact with the head of the lift bolt 52, the middle mold 16 will not go up anymore, and thus only the movable mold 4 continues to go up. In this process, the tube 70 and the container mouth section (molded section) are left attached in the middle mold 16 by the undercut at the male screw part of the container mouth section. On the other hand, the core 34 continues to go up, so that the runner branch is cut off at the inner wall of the container mouth section (molded section) of the smaller-diameter gate section, with the gate section left remaining through the gate hole 44. The mold-opening continues up to the mold-opening completion position before the mold-opening is completed (FIG. 6).

Upon release of the stoppage of the rotary plate 18 by the stopper cylinder 35 and the positioning cylinder 26, the middle mold 16, once located on the molding stage X, is transferred to the withdrawal stage Z to the prescribed position. Now the mold splitting cylinder 29 is set to drive, advancing the wedge 30 at the rod end thereof into the split mold (a pair of nests), and the split mold is opened against the elastic force of the split-mold spring 57 (FIG. 5).

A suitable robot device can be set to work to take out the tube container in the upward direction and the runner branch in the downward direction.

Similar mold-tightening and injection are applied to the middle mold 16 which has been transferred to the molding stage X.

Thus, sequential rotation of the rotary plate 18 allows continuous molding of tube containers.

Figure 11:
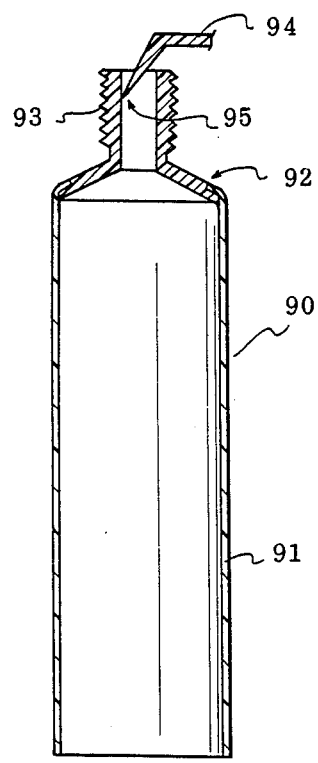
FIG. 11 shows a vertical, sectional view of the tube container which has been produced.

FIG. 11 shows the molded tube container 90. It consists of a tube container proper 91 in the form of a cylinder and a container mouth section 92. A content withdrawing cylinder 93 of the container mouth section 92 may be either a cylinder with a male screw surface for engaging a cap (not shown) or a cylinder with a catch section (not shown) onto which a cap can be locked.

The pin-point gate 95 of a runner branch 94 is located on the inner face of the container mouth section 92. (Note that, although the runner branch is automatically cut at the mold splitting process as already described, it is shown as attached to facilitate understanding).

Therefore, the root left after the runner branch 94 has been cut off is inside the container mouth section without disturbing the cap application. The cap may be applied so tightly as to prevent any possibility of liquid to leak out. The root of the runner branch which is not seen from outside does not impair the appearance.

The process and apparatus of the present invention have been described by use of a suitable manufacturing apparatus. The applicable manufacturing apparatus is not restricted to the above-described rotary system, but may be a slide system provided with two sets of middle molds or merely a single system provided with one middle mold.

One of the essential features of the present invention lies in that a tube is inserted into a split mold in a closed state, a core is then applied on the tube, and finally the cavity is filled with the resin melt.

Figure 12:
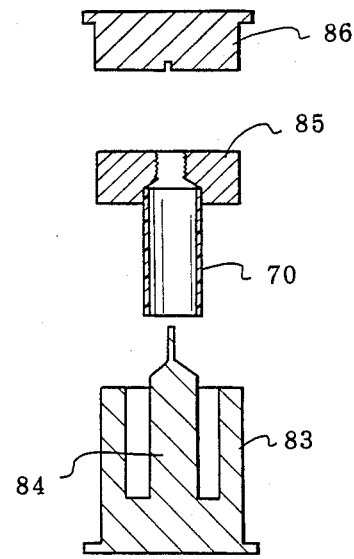
FIG. 12 shows a sectional view of a tube container illustrating the molding thereof by compression molding.

The embodiment described above has used injection molding which carries out the resin melt filling operation by means of an injection machine. This invention is not restricted to this molding method but may employ compression molding. In the case of compression molding, as shown in FIG. 12, a tube 70 is first inserted into a split mold 85 in the closed state, and then a core mold 83 is raised until the core 84 is inserted in the tube 70. Thus, a prescribed cavity for the container mouth section is formed. Then, resin melt is introduced into the cavity and subjected to compression by a movable mold 86. After molding, the split mold 85 is split to take out the tube container.

Figure 13:
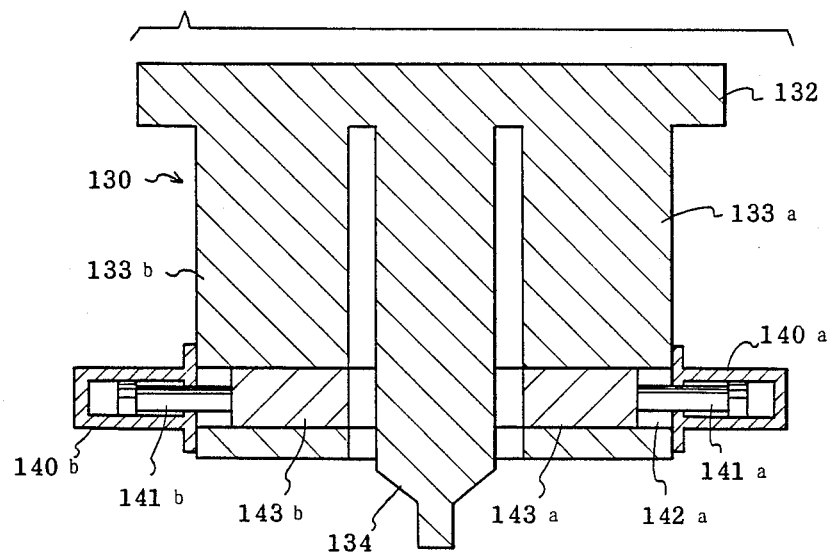
FIG. 13 shows a vertical, sectional view of a core mold and a split mold for a 2-plate system.
Figure 13:
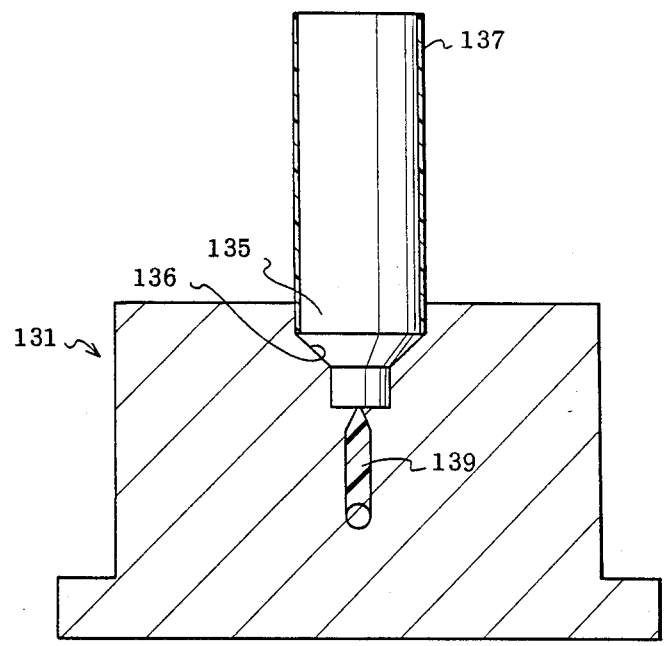
Figure 14:
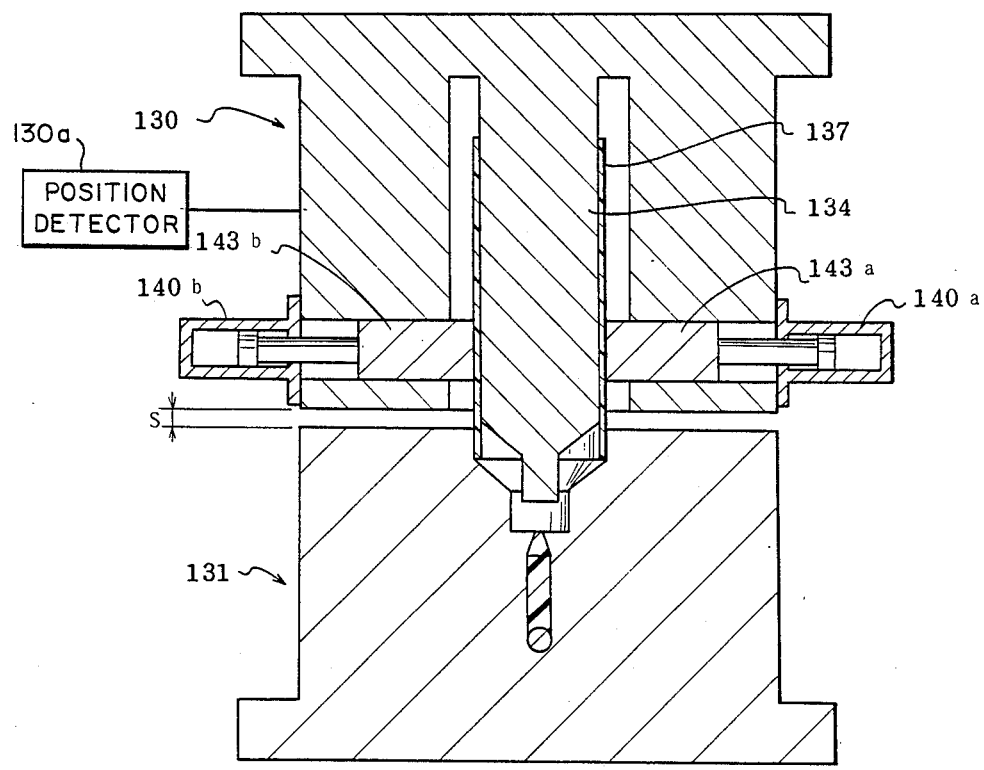
FIG. 14 shows a vertical, sectional view illustrating the state where, in the mold of FIG. 13, the tube holding means holds the tube into which the core is introduced.

Another embodiment of the present invention will be described by reference to FIGS. 13-15. A movable mold 130 is attached to a movable board of a mold open-closing device (not shown) and is capable of moving to and from a split mold 131. The movable mold 130 is provided with an attachment board 132 for attachment to the movable board, vertical walls 133a and 133b extending from the attachment board 132 toward the split mold 131, and a core 134, located between the vertical walls 133a and 133b, which is fixed on the attachment board 132 and whose forward end projects downward below the lower face of the vertical wall 133. A cooling water path (not shown) is formed in the core 134.

The core 134 has the form of a cylinder, and the outer shape of the forward end section thereof is made to form the shape of the inner face of the container mouth section of the tube container to be obtained.

The split mold 131 is attached to a fixed board of a mold open-closing device not shown. The split mold 131 has a tube insert hole 135. The lower section of the tube insert hole 135 is reduced in size into the form of a funnel, forming a cavity face 136 which defines the outer shape of the container mouth section. When the mold is closed, the forward end section of the core 134 of the movable mold 130 advances into the tube insert hole 135 together with an intervening tube 137, and a cavity 138 for molding the container mouth section is formed by the forward end face of the core 134 and the cavity face 136.

The split mold 131 is usually kept closed under the pressure of a spring (not shown).

A hot runner 139 is provided for injecting the resin melt into the cavity 138.

A clamp cylinder 140a is fixed at the lower section of the vertical wall 133a of the movable mold 130, and the rod 141a thereof moves within a through-hole 142a which is provided on the vertical wall 133a in the direction toward the core 134. At the forward end of this rod is fixed a holding piece 143a which pushes the tube 137 against the outer face of the core 134. The forward end face of the holding piece 143a is in the form of semicircular arc in correspondence with the circular arc face of the core 134.

At the corresponding position on the other vertical wall 133b, there is provided a similar cylinder device including a clamp cylinder 140b, a rod 141b and a fixed holding piece 143b. The tube holding means includes both of the cylinder devices. Therefore, the tube 137 is held by being pushed by both the holding pieces 143a and 143b against the core 134 over almost the entire circumference.

The mold open-closing device is provided with not only a mold open-closing control position detector but also a position detector 130a which detects the movable mold 130 at a position which is a prescribed, adjustable distance "S" (FIG. 14) before the mold-close completion position. A detection signal from the position detector is inputted to a driving device (not shown) for the clamp cylinders 140a and 140b to drive the clamp cylinders 140a and 140b, and controls both the holding pieces 143a and 143b to hold the tube 137 against the core 134 at a position which is a prescribed distance "S" before the mold-close completion position. The driving device for the clamp cylinders 140a and 140b is controlled so that an injection process completion signal returns the clamp cylinders 140a and 140b to the original position.

The control of the above-mentioned mold open-closing device may, of course, be made in sequence utilizing a mold open-closing control position detector, such as an "S" position detector, etc.

The procedure for molding operation will be described. The tube 137 is inserted into the tube insert hole 135 of the split mold 131 in its open state. At that time the lower end of the tube 137 is not yet bent (FIG. 13). Mold-closing is then initiated. The movable mold 130 moves down toward the split mold 131, and the core 134 enters the tube 137. As soon as the movable mold 130 reaches the position which is a distance "S" before the split mold 131, the position detector will output a signal. This signal causes the driving device for the clamp cylinders 140a and 140b to send pressure oil to the back chambers of the clamp cylinders 140a and 140b. Rods 141a and 141b and holding pieces 143a and 143b fixed on the rods advance toward the core 134. Then both the holding pieces 143a and 143b push the tube 137 against the core 134 (FIG. 14).

Therefore, as the movable mold 130 moves further down, the tube 137 also goes down, so that the forward end of the tube 137 is forced to slide on the tapered wall of the cavity face 136, which is slightly inclined inward.

Figure 15:
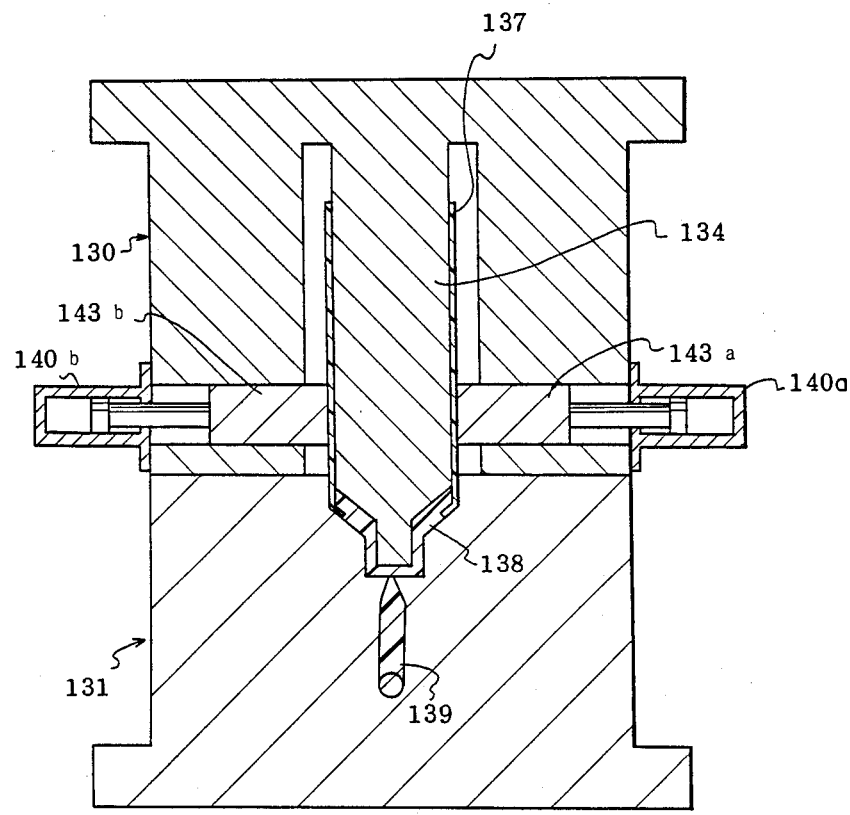
FIG. 15 shows a vertical, sectional view illustrating the mold of FIG. 13 in a closed state and having a resin melt injected thereinto.

Upon completion of mold closing, an injection machine, not shown, injects resin melt into the cavity 138 via the hot runner 139 (FIG. 15).

The tube holding means prevents the injection pressure from drawing the tube 137 out of the insert hole 135.

Upon completion of the injection process, the clamp cylinders 140a and 140b are operated to release the holding of the tube 137. Solidification by cooling followed by mold opening yields a tube container with a secured container mouth section.

The tube holding means is set at the foot of the vertical wall 133 of the movable mold 130, i.e., close to the split mold 131. Therefore, any tubes of different lengths may be held by the tube holding means and pushed in to have their forward ends bent to a prescribed amount. Thus, the same mold may be used to handle tube containers which have the same diameter but different capacities, i.e., lengths.

The length of the forward end of the tube to be bent may easily be adjusted by changing the detection position of the movable mold 130 by the position detector.

The position detector, which is provided on the mold open-closing device in the above embodiment, may be provided on the mold. The driving of the holding means may be controlled on the basis of the time lapse from the start of mold closing, instead of the position of the movable mold. The holding means may be a mechanical means such as a cam device or link device instead of the cylinder.

Figure 16:
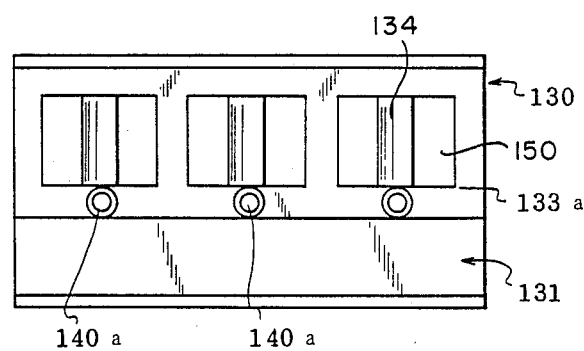
FIG. 16 shows a front view of the state where a window is open on the vertical wall of the core mold.
Figure 17:
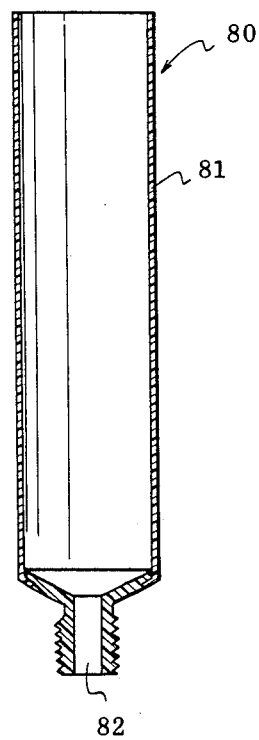
FIG. 17 shows a vertical, sectional view of a conventional tube container.
Figure 18:
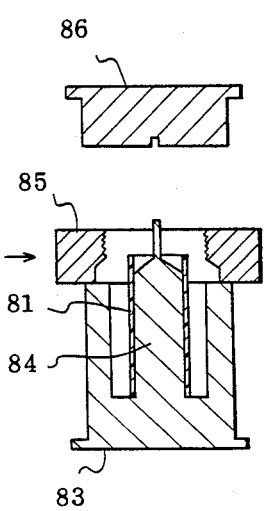
FIGS. 18–20 illustrate the sequence for molding a tube container by the conventional compression molding apparatus, where
Figure 19:
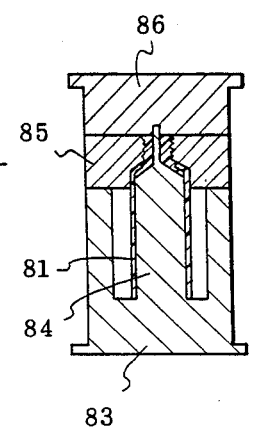
Figure 20:
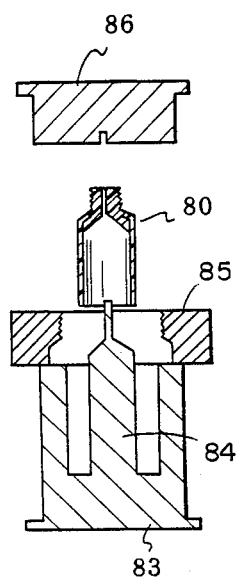

FIG. 16 shows the vertical walls 133a and 133b of the movable mold 130 with a window 150. This window 150 allows the core 134 to be observed easily from the outside during the insert state of the tube 137, e.g., during the occurrence of deformation. In addition, the window 150 facilitates cleaning of the inside of the movable mold 130, which is required in case the resin should accidentally leak into the movable mold 130.

The window section may be provided, for example, with an optical sensor which allows image recognition of the deformation of the inserted substances. Thus, a monitoring of the condition of inserted substances may be easily subjected to automation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tube container molding apparatus for forming a resin-molded container mouth section to the end of a tube, which comprises:
    a split mold provided with a tubular bushing defining a tube insert hole into which forward end section of a tube which forms the container proper of the tube to be produced is inserted in advance of cooperation of said split mold with a movable core mold, said split mold being separable over said tube insert hole;
    an energizing means for maintaining said split mold in a closed state at least during inserting said tube into said tube insert hole of said split mold and forming said container mouth section; and
    said movable core mold having a core insertable into said tube within said tube insert hole of said split mold, from the rear end of said tube, and said core in conjunction with an inner face of said split mold defining a cavity for molding said container mouth section on the forward end of said tube.

2. A tube container molding apparatus for forming a resin-molded container mouth section to the end of a tube, which comprises:
    a split mold provided with a tubular bushing defining tube insert hole into which the forward end section of a tube which forms the container proper of the tube container to be produced is inserted in advance of cooperation of said split mold with a movable core mold, said split mold being separable over said tube insert hole;
    an energizing means for maintaining said split mold in a closed state at least during inserting said tube into said tube insert hole of said split mold and forming said container mouth section;
    said movable core mold having a core insertable into said tube within said tube insert hole of said split mold, from the rear end of said tube, and said core in conjunction with an inner face of said split mold defining a cavity for molding said container mouth section on the forward end of said tube;
    a tube holding means engageable with said tube to push said tube against a peripheral face of said core to prevent said tube from slipping out by injection pressure; and an injection means to inject resin melt into said cavity.

3. The tube container molding apparatus according to claim 2 wherein the apparatus further comprises:

a control means connected with means for actuating said tube holding means to press said tube against a face of said core midway during the advance of said core into said tube so that said tube whose forward end section is previously inserted into said split mold further advances into said split mold together with said core and thus has the forward end section thereof bent inward along the inner face of said split mold.

4. The tube container molding apparatus according to claim 3 wherein said control means includes a position detecting means for detecting an advanced position of a support for said core.

5. The tube container molding apparatus according to claim 2 wherein said core mold includes a vertical wall having an end face which is abuttable with a face of said split mold during mold closing, and a tube holding means is mounted on said vertical wall.

6. The tube container molding apparatus according to claim 5 wherein said vertical wall includes a window which allows at least the base section of said core to be observed from the outside.

7. A tube container molding apparatus for adhering a resin-molded container mouth section to the end of a tube, which comprises:

a fixed mold having a resin passage means formed therein;

a movable mold which is positioned facing said fixed mold, having a core projecting toward said fixed mold, and capable of moving to and from said fixed mold;

a rotary plate having an opening therethrough;

a middle mold positioned between said fixed mold and said movable mold and supported elastically on said rotary plate, said middle mold being movable through said opening, said middle mold having a split mold which is provided with a tube insert hole into which the forward end section of a tube which forms the container proper of the tube container to be produced is to be inserted, and forming, in conjunction with the end face of said core and the inner face of said tube insert hole, a cavity for molding said container mouth section when said movable mold is transferred toward said fixed mold and said core enters the rear end of said tube inserted into said tube insert hole to mold closing;

an energizing means for maintaining said split mold of said middle mold in a closed state; and an injection device which injects resin melt into said cavity through said resin passage means in said fixed mold.

8. The tube container molding apparatus according to claim 7 wherein said support table is a slide table which is reciprocable in a horizontal plane whereby the movement of said slide table allows said middle mold to travel either between said fixed mold and said movable mold or outside between said fixed mold and said movable mold.

9. The tube container molding apparatus according to claim 7 wherein, the bottom face of said split mold faces to the upper face of said fixed mold, and there is grooved a resin passage means which is connected to the resin passage means of said fixed mold on the bottom face thereof;

the forward end section of the core of said movable mold is formed as a reduced-diameter section whose most forward section is passed through the cavity of said split mold and slides closely into a hole of said split mold; and on said reduced-diameter section a gate hole is provided which has one end open, so as to connect with said resin passage means of said split mold, to a position out of the cavity thereof, the other end opens as a pin point gate to the cavity of said split mold.

10. The tube container molding apparatus according to claim 9, wherein, said resin passage means grooved on the bottom face of said split mold bridges adjacent split molds; and there is provided an undercut section on the bottom section of said middle mold to adhere resin left in the resin passage means after molding on the bottom face thereof as a runner branch.

11. The tube container molding apparatus according to claim 7 further comprising a tube holding piece which holds said tube by pushing said tube against the outer face of said core to prevent said tube from slipping out by injection pressure.

12. The tube container molding apparatus according to claim 11 wherein said movable mold includes a vertical wall having an end face which is abuttable with a face of said split mold during mold closing which, during mold closing, receives the mold-closing pressure in contact with the face of said middle mold, and said tube holding piece is mounted on said vertical wall.

13. The tube container molding apparatus according to claim 11 further comprising:

a control means connected with means for pressing said tube against a peripheral face of said core midway during the advance of said core into said tube so that said tube whose forward end section is previously inserted into said split mold further advances into said split mold together with said core and thus has the forward section thereof bent inward along the inner face of said split mold.

14. The tube container molding apparatus according to claim 13 wherein said control device means which controls said tube holding piece includes a position detecting means for detecting the position of means supporting said core in said tube.

15. The tube container molding apparatus according to claim 7 wherein, said rotary plate is rotated in a horizontal plane by a rotating mechanism; and at least three sets of middle molds are disposed at constant intervals on said rotary plate, said sets are positioned selectively between said fixed mold and said movable mold and can pass through an opening in said rotary plate and are supported by elastic force of springs provided on said rotary plate surrounding said opening whereby the rotation of said rotary plate allows said middle molds to be sequentially positioned between said fixed mold and said movable mold.

16. The tube container molding apparatus according to claim 15 wherein the forward end section of a tube is inserted into said middle mold just before said middle mold is rotationally positioned between said fixed mold and said movable mold;

means for molding the tube container when said rotary table is set to rotate to position said middle mold between said fixed mold and said movable mold; and means for withdrawing a product from said middle mold when said rotary table is set to rotate to remove said middle mold, after molding, from between said fixed mold and said movable mold.

17. The tube container molding apparatus according to claim 15 further comprising a mold splitting device which splits the split mold of said middle mold when rotation of said rotary table brings said middle mold from between said fixed mold and said movable mold to the position for withdrawing molded products.

18. The tube container molding apparatus according to claim 17 wherein said mold-splitting device is a mold-splitting cylinder having a rod equipped at the forward end thereof with a wedge designed to enter into and split said split mold.

* * * * *